(12) United States Patent
Hill et al.

(10) Patent No.: US 6,996,640 B1
(45) Date of Patent: Feb. 7, 2006

(54) METHOD AND SYSTEM FOR ASYNCHRONOUSLY TRANSFERRING DATA

(75) Inventors: Timothy R. Hill, Orlando, FL (US); Thomas Trocine, Oviedo, FL (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 10/935,013

(22) Filed: Sep. 3, 2004

Related U.S. Application Data

(63) Continuation of application No. 09/923,558, filed on Aug. 7, 2001, now abandoned.

(51) Int. Cl.
*G06F 3/00* (2006.01)

(52) U.S. Cl. .............................. 710/56; 710/53; 710/54; 710/55; 710/57

(58) Field of Classification Search .................. 710/52, 710/53, 54, 55, 56, 57
See application file for complete search history.

(56) References Cited

U.S. PATENT DOCUMENTS

| | | | |
|---|---|---|---|
| 4,463,443 A | | 7/1984 | Frankel et al. |
| 4,750,113 A | * | 6/1988 | Buggert ........................ 710/64 |
| 4,888,739 A | | 12/1989 | Frederick et al. |
| 5,450,546 A | | 9/1995 | Krakirian |
| 5,471,583 A | | 11/1995 | Au et al. |
| 5,513,224 A | * | 4/1996 | Holt ............................ 375/372 |
| 5,524,270 A | | 6/1996 | Haess et al. |
| 5,668,767 A | | 9/1997 | Barringer |
| 5,717,342 A | | 2/1998 | Lotfi et al. |
| 5,721,839 A | | 2/1998 | Callison et al. |
| 5,758,192 A | | 5/1998 | Alfke |
| 5,832,308 A | | 11/1998 | Nakamura et al. |
| 5,884,099 A | | 3/1999 | Klingelhofer |
| 5,892,920 A | | 4/1999 | Arvidsson et al. |
| 5,898,893 A | | 4/1999 | Alfke |
| 5,918,073 A | | 6/1999 | Hewitt |
| 5,948,082 A | | 9/1999 | Ichikawa |
| 6,088,743 A | * | 7/2000 | Takeda ......................... 710/52 |
| 6,101,575 A | | 8/2000 | Simms et al. |
| 6,263,410 B1 | | 7/2001 | Kao et al. |
| 2001/0011311 A1 | * | 8/2001 | Takeda ......................... 710/61 |

OTHER PUBLICATIONS

Lois Cartier, "*Using Select-RAM Memory in XC4000 Series FPGAs*," Jul. 7, 1996, XILINX Application Note, XAPP 057 Version 1.0, pp. 1-2.

* cited by examiner

*Primary Examiner*—Kim Huynh
*Assistant Examiner*—Alan S Chen
(74) *Attorney, Agent, or Firm*—Enrique J. Mora; Beusse, Brownlee, Wolter, Mora & Maire, P.A.

(57) ABSTRACT

The present invention provides method, data transfer controller and system for asynchronously transferring data. The method allows to provide a buffer device. The method further allows to define in the buffer device a plurality of buffer segments. Respective ones of the buffer segments are filled with data from at least one data source device operating in a respective clock domain. Upon any respective buffer segment being filled up, the method allows to generate an indication of availability of the contents of the respective buffer segment to at least one data destination device operating in a respective clock domain. The clock domain of the at least one source device is distinct than the clock domain of the at least one destination device.

5 Claims, 2 Drawing Sheets

METHOD AND SYSTEM FOR ASYNCHRONOUSLY TRANSFERRING DATA

This application is a continuation of U.S. patent application Ser. No. 09/923,558, filed Aug. 7, 2001, now abandoned.

The present invention is generally related to data transfer between devices running at different clock rates, and, more particularly, the present invention is related to a data transfer technique that allows to divide or map a buffer device into a plurality of segments for more efficient and reliable execution of data transfer between such devices.

A buffer or memory unit can be used to temporarily store information for transfer between two devices running at different clock rates. Separate input and output terminals on the buffer allow data to be input into the buffer at one clock rate and output from the buffer at a different clock rate. Thus, when the buffer is placed between a data source device and a data destination device running on two different clock rates, the buffer can match data flow between the two units by accepting data from a source unit at one rate of transfer and delivering data to a destination unit at a different rate. If, for example, the source device is slower than the destination device, the buffer can be filled with data at a slower rate and later emptied at a higher rate. Conversely, if the source device is temporarily faster than the destination device, the buffer may store the bursts of data and output the data in the time interval between bursts.

If no mechanism is provided by the buffer to indicate how much data has been stored in it by the source device in real time, the source and destination control logic would "store and forward" the data. That is, when all of the data to be transferred has been stored or the buffer becomes full, the source device must stop filling the buffer, and the destination device may begin draining the buffer. This unfortunately, under some conditions, can introduce a significant amount of latency in the transfer of data between such devices.

It is known that if the cumulative input of data into the buffer significantly exceeds the cumulative output of data by the buffer, memory overflow can result. Conversely, if the cumulative output of data from the buffer exceeds the cumulative inflow of data over a significant period of time, memory underflow or the emptying of the buffer memory and the output of invalid data may result. Thus, to prevent either of these undesirable conditions from occurring, conventional asynchronous buffer generally use flag circuitry to indicate their status. Conventional flag circuitry includes logic that continuously compares the values of the input and output data pointers and indicates when they are close (buffer emptying) or distant (buffer filling). Copies of the input (write) and output (read) pointers are synchronized and continuously compared. The comparison logic in the flag circuitry provides status information, which may include threshold information, as well as indicators or flags that warn when the buffer is empty or when the buffer is full, or under other conditions, such as half-full, almost full, almost empty, etc.

One drawback of known flag circuitry is that complex comparison circuitry is required. The comparators themselves require complicated logic. Synchronization logic that enables comparison between the two clock domains incrementally slows the data transfer process and incrementally adds cost to the overall data transfer circuitry. In small buffers, the complexity of the overhead logic is excessive. Larger circuits suffer less from the overhead created by conventional flag circuitry because the increase in number of logic elements in a comparator and synchronization logic circuit is generally proportional to the base-2 logarithm of the buffer size. The relatively slow increase in circuit requirements makes conventional buffer flag logic somewhat less burdensome for large buffers; however, in small buffers the complexity of the comparators and synchronizers can significantly exceed the complexity of the buffer Random Access Memory (RAM) and pointers.

Regardless of the size of the buffer, the flag indications are typically generated by comparing byte count values from the source and destination clock domains. However, each byte count value comprises a set of multiple bits that must be simultaneously sampled to obtain a coherent value. Since the source and destination devices are typically in asynchronous clock domains, these flags will similarly change their respective states in an asynchronous manner. Thus, if great care is not exercised in how the byte counts from the different clock domains are compared, false glitches will be generated for the foregoing flags as data moves through the buffer.

Thus, it would be desirable to provide system and method for transferring data between devices that is not subject to the foregoing drawbacks. That is, it would be desirable to provide system and method that are not subject to the substantial data latency that may be encountered in store-and-forward buffer devices; or without having to employ the complex comparison circuitry for setting flag indications, that, notwithstanding of its complexity and relatively high-cost, still may result in erroneous flag indications or instabilities due to the inherent difficulties of trying to simultaneously sample byte count values consisting of multiple bits in a multi-domain clock environment.

BRIEF SUMMARY OF THE INVENTION

Generally, the present invention fulfills the foregoing needs by providing in one aspect thereof a method for asynchronously transferring data. The method allows to provide a buffer device. The method further allows to define in the buffer device a plurality of buffer segments. Respective ones of the buffer segments are filled with data from at least one data source device operating in a respective clock domain. Upon any respective buffer segment being filled up, the method allows to generate an indication of availability of the contents of the respective buffer segment to at least one data destination device operating in a respective clock domain. The clock domain of the at least one source device is distinct than the clock domain of the at least one destination device.

The present invention further fulfills the foregoing needs by providing in another aspect thereof, a data transfer controller for asynchronously transferring data by way of a buffer device. The controller includes a segment module configured to define a plurality of buffer segments in the buffer device. Respective ones of the buffer segments are filled with data from at least one data source device operating in a respective clock domain. A buffer segment-availability gauge is configured to generate, upon any respective buffer segment being filled up, an indication of availability of the contents of the respective buffer segment to at least one data destination device operating in a respective clock domain. The segment-availability gauge is further configured to generate, upon the contents of the respective segment being transferred to the destination device, an indication of availability of that buffer segment for further refilling of data from the source device.

The present invention further provides in still another aspect thereof, a system for asynchronously transferring data. The system includes a data buffer device. A buffer-segment module is configured to define a plurality of buffer segments in the buffer device, respective ones of the buffer segments are filled with data from at least one data source device operating in a respective clock domain. A segment-availability gauge is configured to generate, upon any respective buffer segment being filled up, an indication of availability of the contents of the respective buffer segment to at least one data destination device operating in a respective clock domain. The indication is based on a single-bit signal uniquely associated with the respective buffer segment to indicate whether the buffer segment is full. The buffer segment-availability gauge is further configured to generate, upon the contents of the respective buffer segment being transferred into the destination device, an indication of availability of that buffer segment for further refilling of data from the source device. The indication is based on whether the single-bit signal indicates the buffer segment as being empty.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
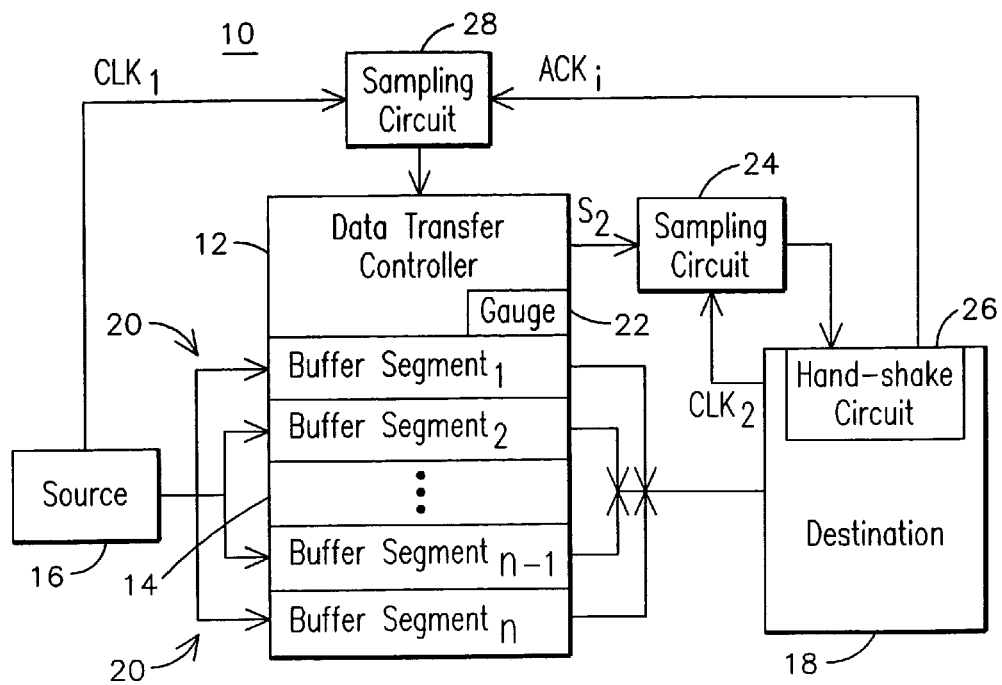
FIG. 1 illustrates a block diagram representation of a system including a data transfer controller for asynchronously transferring data via a buffer device mapped into a plurality of buffer segments, and including a segment-availability gauge in accordance with aspects of the present invention.

FIG. 1 illustrates a system 10 including a data transfer controller 12 for asynchronously transferring data by way of a buffer device 14, such as a first-in, first-out, last-in, last-out, or any other type of generally temporary storage device, between a data source device 16 and data destination device 18. A buffer-segment module, conceptually represented by branches 20, is configured to define a plurality of buffer segments in the buffer device, e.g., buffer SEGMENT$_1$ through buffer SEGMENT$_n$. In one exemplary embodiment, the size and/or number of the buffer segments may be dynamically adjustable from a selectable range of buffer segment size and/or number. For example, assuming the total size of the buffer is 512 bytes, and further assuming that the selectable range of the number of segments is from two to eight buffer segments, then the size of each segment would be equal to 64 bytes in case the buffer was mapped or divided into eight buffer segments. Conversely, the size of each segment would be equal to 256 bytes in case the buffer was mapped or divided into two segments. As suggested above, respective ones of the buffer segments are filled with data from the data source device 16 operating in a respective clock domain, e.g., CLK1.

A segment-availability gauge 22 is configured to generate, upon any respective buffer segment being filled up, an indication of availability of the contents of the respective buffer segment to the data destination device 18 operating in a respective clock domain, e.g., CLK2. As further explained below, the segment-availability gauge 22 is further configured to generate, upon the contents of the respective segment being transferred to the destination device, an indication of availability of that buffer segment for further refilling of data from the source device 16. The generating of the respective indications of buffer segment availability comprises determining the state of a respective buffer gauge signal ($S_i$) uniquely associated with each buffer segment. That is, buffer gauge signal ($S_i$) would be uniquely associated with buffer SEGMENT$_i$. In a preferred embodiment, the buffer signal uniquely associated with each buffer segment comprises a single-bit signal that is sampled in a sampling circuit 24 using a standard sampling technique, such as a double-sampling technique, for appropriate synchronization to the clock domain of the destination device. For example, in the event the state of the respective buffer gauge signal indicates the buffer segment is full, the indication of availability of the buffer segment contents to the data destination device would be triggered. Conversely, in the event the state of the respective buffer gauge signal indicates the buffer segment is empty, the indication of availability of that buffer segment for further refilling of data from the source device would be triggered. In this case, a respective acknowledge ($ACK_i$) signal from a hand-shake circuit 26 in destination device 18 would be sampled by a sampling circuit 28 synchronized back to the clock domain of the source 16 using, for example, the above-cited double sampling technique. It will be appreciated that each $ACK_i$ signal may be associated with each buffer SEGMENT$_i$ to indicate the availability of that buffer segment for further refilling of data from the source device 16, once the destination device has acknowledged transfer of the contents of the buffer SEGMENT$_i$.

Although FIG. 1, for the sake of simplicity of illustration, illustrates a single source device and a single destination device, it will be understood that the techniques of the present invention are not limited to a single source or destination device. Thus, it will be understood that the techniques of the present invention can be adapted to applications involving multisource and/or multidestination devices. For example, assuming a total of eight segments in the buffer, SEGMENT$_1$ and SEGMENT$_2$ could be mapped for transferring data from a first source device (e.g., source 16) to a first destination device (e.g., destination 18); SEGMENT$_3$ and SEGMENT$_4$ could be mapped for transferring data from a second source device to the first destination device; SEGMENT$_5$ and SEGMENT$_6$ could be mapped for transferring data from the first source to a second destination device, and SEGMENT$_7$ and SEGMENT$_8$ could be mapped for transferring data from either the first or the second source to a third destination device. It will be further understood that the present invention is not limited to any particular sequence for the filling and/or draining of the buffer segments.

Figure 2:
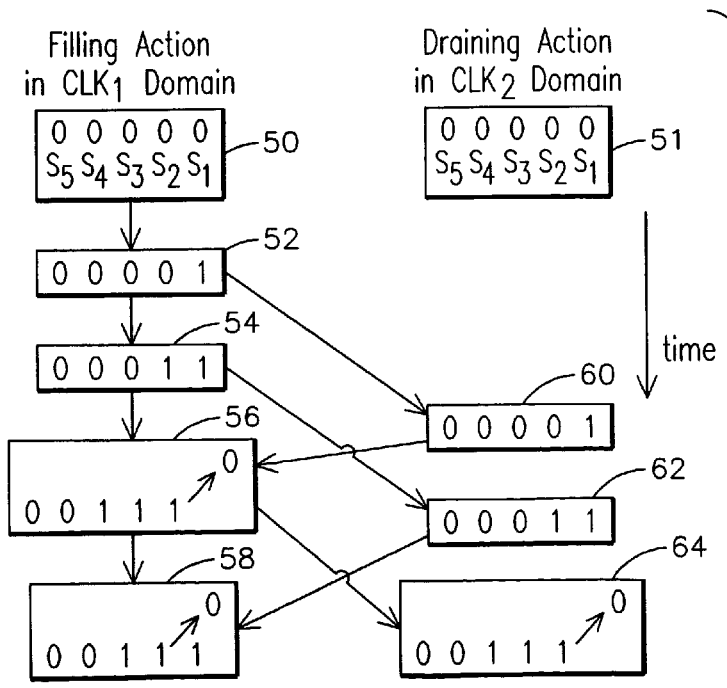
FIG. 2 illustrates an exemplary sequence of buffer segments filling and draining actions in accordance with aspects of the present invention.

FIG. 2 illustrates an exemplary sequence of buffer segments filling and draining in their respective clocking domains in accordance with aspects of the present invention. As shown in FIG. 2, blocks 50 and 51 respectively illustrate the initial condition of the buffer segments in the buffer device 14 (FIG. 1). Block 52 illustrates a buffer gauge indication where a buffer segment, e.g., buffer SEGMENT$_1$, has been filled with data from the source device 16 (FIG. 1), and the contents of that buffer segment are ready for transfer to the destination device 18 (FIG. 1). For example, in this case the single bit signal $S_1$ associated with buffer SEG- MENT$_1$ would be set to logical one. Similarly, block 54 illustrates a buffer gauge indication where another buffer segment, e.g., buffer SEGMENT$_2$, has been filled with data from the source device, and the contents of that buffer segment are ready for transfer to the destination device 18. For example, in this case the single-bit signal S$_2$ associated with buffer SEGMENT$_2$ would be set to logical one and since buffer SEGMENT$_1$ has not yet being drained, then signal S$_1$ would continue to be set to logical one.

Block 56 illustrates a buffer gauge indication where buffer SEGMENT$_3$ has been filled with data from the source device, and the contents of that segment are ready for transfer to the destination device.

Block 60 illustrates a situation where the destination device acknowledges transfer of the contents from buffer SEGMENT$_1$ to the destination device. In this case, signal ACK$_1$ would be set to logical one. It will be apparent to those skilled in the art, that the data transfer example of FIG. 2 corresponds to a situation wherein the buffer segment draining action is slower relative to the segment filling action. It will be understood, however, that the principles of the present invention would apply equally effective to the reverse situation. That is, a situation wherein the buffer segment draining action is faster relative to the segment filling action, or combinations thereof. Returning to block 56, one can see, that since buffer SEGMENT$_1$ has been emptied, then the single-bit signal S$_1$ uniquely associated with buffer SEGMENT$_1$ would be set to logic zero to indicate that buffer SEGMENT$_1$ is empty and ready for further data refill from the data source. Block 58 illustrates a buffer gauge indication where buffer SEGMENT$_4$ has been filled and its contents are ready to be transferred to the destination device. Block 62 illustrates a situation where the destination device acknowledges transfer of the contents from buffer SEGMENT$_2$ to the destination device. In this case, signal ACK$_2$ would be set to logical one. Returning to block 58, as suggested above, since buffer SEGMENT$_2$ has been emptied, then the single-bit signal S$_2$ uniquely associated with buffer SEGMENT$_2$ would be set to zero to indicate that buffer SEGMENT$_2$ is empty and ready for further data refill from the data source. Block 64 reflects the buffer gauge indication executed in block 56 regarding the availability of buffer SEGMENT$_1$.

Figure 3:
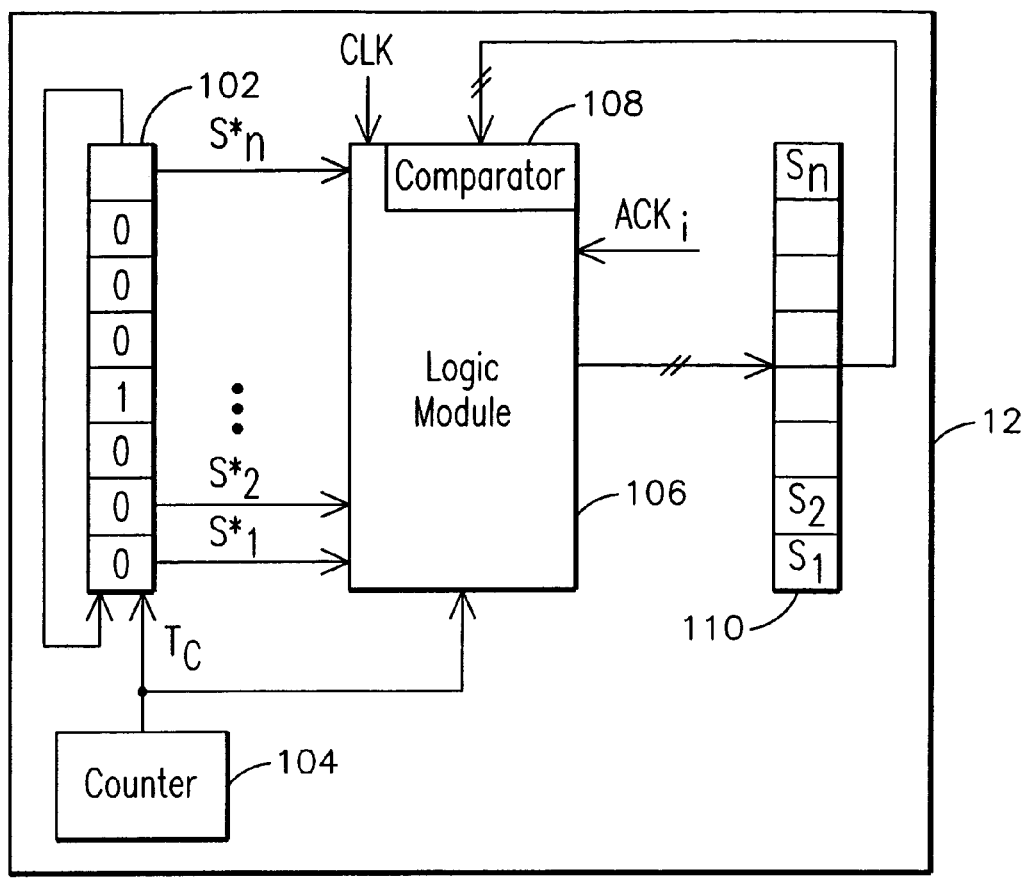
FIG. 3 illustrates one exemplary embodiment for the segment-availability gauge of FIG. 1.
Figure 4:
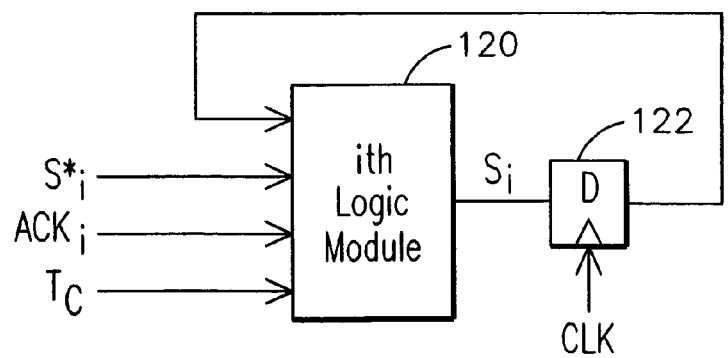
FIG. 4 illustrates details in connection with the segment-availability gauge of FIG. 2.

FIG. 3 illustrates a block diagram representation of one exemplary embodiment of segment-availability gauge 22 (FIG. 1) for asynchronously transferring data, as discussed in the context of FIGS. 1 and 2. As shown in FIG. 3, a register, such as circular register 102, is responsive to a terminal count (TC) signal from a counter 104 configured to count data words transferred to a respective buffer segment. The counter 104 supplies respective signals S$_1$* through S$_n$* indicative of the particular buffer segment that is being presently filled by the source. The segment-availability gauge further includes a logic module 106 coupled to the register 102 and counter 106 to set the respective signal (S$_i$) indicative of each buffer SEGMENT$_1$ being filled-up upon the counter reaching the maximum data word count for the buffer SEGMENT$_i$. Logic module 106 is further responsive to each acknowledge signal ACK$_i$ to reset the signal (S$_i$), once the SEGMENT$_i$ has been emptied. That is, when the contents of SEGMENT$_i$ have been acknowledged as transferred into the destination device. FIG. 4 illustrates an exemplary construction of each i$^{th}$ logic module 120 that in combination make up the overall logic module 106 for setting each respective gauge signal S$_i$ that indicates the availability or lack thereof of SEGMENT$_i$ for filling or draining. For example, assuming the total number of buffer segments is eight, then logic module 106 would be made up of eight individual circuits as illustrated in FIG. 4.

As further shown in FIG. 3, a comparator 108 is configured to determine whether the state of each respective single-bit signal (S$_i$) uniquely associated with a respective buffer segment, such as buffer SEGMENT$_i$, is indicative of whether the respective buffer segment is full or empty. It will now be appreciated by those skilled in the art, that in accordance with one key advantage of the present invention, making such a determination of the state of a single-bit signal in a multiclock domain is far simpler and reliable than making a determination using a signal comprising multiple bits, as is typically required by known techniques, as explained in the background section of the present invention. Segment-availability gauge 22 further includes a register 110, or other suitable memory component, such as flip-flop 122 (FIG. 4) that allows for storing and tracking the respective state of the respective signal S$_i$ uniquely associated with each SEGMENT$_i$ of the buffer device. It will be appreciated by those skilled in the art, that the circuit embodiments illustrated in FIGS. 3 and 4 are merely illustrative of one possible implementation for performing the techniques described in the context of FIGS. 1 and 2, and should not be construed to limit the present invention since one skilled in the art will now be able to design equivalent implementations capable of performing the same functions and providing the same advantageous results described herein.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A data transfer controller for asynchronously transferring data by way of a buffer device comprising a plurality of data storage locations without performing a read address and write address comparison, the controller comprising:
   a buffer-segment module configured to define a plurality of buffer segments comprising at least two data storage locations in the buffer device, the data storage locations of respective ones of the buffer segments being filled with data from at least one data source device operating in a respective clock domain, wherein the buffer-segment module is further configured to dynamically adjust the number and/or size of the buffer segments; and a segment-availability gauge configured to generate, upon the data storage locations of any respective buffer segment being filled up with said data, an indication of availability of the filled data storage locations of the data contents of the respective buffer segment for transfer to at least one data destination device operating in a respective clock domain, the segment-availability gauge being further configured to generate, upon the contents of the respective segment being acknowledged as transferred to the destination device, an indication of availability of that buffer segment for further refilling of data from the source device, the clock domain of the at least one source device being distinct than the clock domain of the at least one destination device.

2. The controller of claim 1 wherein the segment-availability gauge comprises a comparator configured to determine whether the state of a respective single-bit signal uniquely associated with a respective buffer segment is indicative of whether the respective buffer segment is full.

3. The controller of claim 2 wherein the comparator is further configured to determine whether the state of the single-bit associated with that buffer segment is indicative of whether the respective buffer segment is empty.

4. A system for asynchronously transferring data without performing a read address and write address comparison, the system comprising:

a data buffer device comprising a plurality of data storage locations;

a buffer-segment module configured to define a plurality of buffer segments in the buffer device each buffer segment comprising at least two data storage locations, the data storage locations of respective ones of the buffer segments being filled with data from at least one data source device operating in a respective clock domain; and a segment-availability gauge configured to generate, upon the data storage locations of any respective buffer segment being filled up with said data, an indication of availability of the data contents of the filled data storage locations of the respective buffer segment for transfer to at least one data destination device operating in a respective clock domain, the indication based on a single-bit signal uniquely associated with the respective buffer segment to indicate whether the buffer segment is full, the buffer segment-availability gauge being further configured to generate, upon the contents of the respective buffer segment being acknowledged as transferred into the destination device, an indication of availability of that buffer segment for further refilling of data from the source device, the indication based on whether the single-bit signal indicates the buffer segment as being empty, the clock domain of the at least one source device being distinct than the clock domain of the at least one destination device, wherein the segment-availability gauge includes a register coupled to a counter configured to count data words transferred to a respective buffer segment, the segment-availability gauge further including a logic module coupled to the register and counter to set the respective signal indicative of that buffer segment being filled-up upon the counter reaching the maximum data word count for the buffer segment.

5. The system of claim 4 wherein the logic module is further responsive to an acknowledge signal from the data destination device to indicate transfer of each data word in any respective buffer segment to set the respective signal indicative of that buffer segment being available for further data refilling.

* * * * *